United States Patent
Nwichi-Holdsworth

(10) Patent No.: US 12,345,611 B2
(45) Date of Patent: Jul. 1, 2025

(54) MUTUAL ALIGNMENT OF RAIL GEOMETRY MEASUREMENTS

(71) Applicant: Network Rail Infrastructure Limited, London (GB)

(72) Inventor: Andrew Nwichi-Holdsworth, London (GB)

(73) Assignee: NETWORK RAIL INFRASTRUCTURE LIMITED (GB)

(*) Notice: Subject to any disclaimer, the term of this patent is extended or adjusted under 35 U.S.C. 154(b) by 60 days.

(21) Appl. No.: 17/877,068

(22) Filed: Jul. 29, 2022

(65) Prior Publication Data
US 2024/0035919 A1 Feb. 1, 2024

(51) Int. Cl.
*G01M 5/00* (2006.01)
*B61L 23/04* (2006.01)

(52) U.S. Cl.
CPC ......... *G01M 5/0058* (2013.01); *B61L 23/042* (2013.01)

(58) Field of Classification Search
CPC .............................. B61L 23/042; B61L 23/47
See application file for complete search history.

(56) References Cited

U.S. PATENT DOCUMENTS

| | | | | |
|---|---|---|---|---|
| 5,791,063 A * | 8/1998 | Kesler | ..................... | E01B 35/00 33/651 |
| 8,842,330 B1 * | 9/2014 | Enge | ........................ | B41J 3/543 358/3.23 |
| 2004/0204882 A1 * | 10/2004 | Pedanekar | ............ | B61L 25/026 702/94 |
| 2007/0217670 A1 * | 9/2007 | Bar-Am | ................ | B61L 23/047 382/141 |
| 2011/0096627 A1 * | 4/2011 | Hill | ........................ | G01V 1/282 367/73 |
| 2011/0130669 A1 * | 6/2011 | Garner | ................... | A61B 5/304 600/509 |

(Continued)

OTHER PUBLICATIONS

Weston et al., "Perspectives on railway track geometry condition monitoring from in-service railway vehicles", Vehicle System Dynamics, 2015, pp. 1063-1091, vol. 53, No. 7.

(Continued)

*Primary Examiner* — Michael J Dalbo
(74) *Attorney, Agent, or Firm* — Dentons Davis Brown PC; Matthew Warner-Blankenship

(57) ABSTRACT

A method of aligning rail parameter measurements comprises receiving measurement data indicating variations in a parameter of the rail along the length of the rail derived from measurement runs performed at different points in time, each item of measurement data comprising a value for the parameter and an estimate of the location at which the parameter was measured. A signal is formed corresponding to each measurement run. Pairwise relative offsets are found between spatially overlapping segments in the signals corresponding to consecutive windows within the signals. For each signal and window the average relative offset to other signals is computed. Errors in the location estimates are determined based on the computed average relative offsets. The determined errors are used to refine the location estimates in the signal data.

16 Claims, 8 Drawing Sheets

(56) References Cited

U.S. PATENT DOCUMENTS

2012/0300060 A1* 11/2012 Farritor ............... B61K 9/08
348/125

OTHER PUBLICATIONS

Yang et al., "An Efficient Direction Field-Based Method for the Detection of Fasteners on High-Speed Railways", Sensors, 2011, pp. 7364-7381, vol. 11, No. 8.
Yi et al, "Faults Diagnostics of Railway Axle Bearings Based on IMFs Confidence Index Algorithm for Ensemble EMD", Sensors, 2015, pp. 10991-11011, vol. 18, No. 5.
Abdalla et al., "Extracting Streetlight Poles from Orthophotos: Methodology and Case Study in Ontario, Canada", 2007, pp. 184-187, vol. 133, No. 4.
Al-Douri et al., "A critical review of Information Assurance (IA) framework forcondition-based maintenance of railway tracks", In European Safety and Reliability Conference (ESREL 2016), 2017, pp. 1072-1078, Publisher: CRC Press, Published in: Glasgow.
Bergquist et al., "Cleaning of Railway Track Measurement Data for Better Maintenance Decisions", 2019, p. 9, Publisher: 5th International Workshop and Congress on eMaintenance.
Bracewell, R., "Pentagram Notation for Cross Correlation. The Fourier Transform and Its Applications", 1965, p. 243, vol. 46, Publisher: McGraw-Hill, Published in: New York.
Chen et al., "Railway Track Irregularity Measuring by GNSS/INS Integration", Navigation: Journal of the Institute of Navigation, 2015, pp. 83-93, vol. 62, No. 1.
Coakley et al., "Alignment of Noisy Signals", IEEE Transactions on Instrumentation and Measurement, 2001, pp. 141-149, vol. 50, No. 1.
Dekking et al., "A Modern Introduction to Probability and Statistics: Understanding Why and How", Springer Science & Business Media, 2005.
Ebersohn et al., "Use of Track Geometry Measurements for Maintenance Planning", Transportation Research Record: Journal of the Transportation Research Board, 1994, pp. 84-92, vol. 1470.
Faiz et al., "An Empirical Rail Track Degradation Model Based on Predictive Analysis of Rail Profile and Track Geometry", 2010, Publisher: Loughborough University.
Gabara et al., "A New Approach for Inspection of Selected Geometric Parameters of a Railway Track Using Image-Based Point Clouds", Sensors, 2018, p. 791, vol. 18, No. 3.
Hyslip et al., "Fractal Analysis of Track Geometry Data", Transportation Research Record: Journal of the Transportation Research Board, 2002, pp. 50-57, vol. 1785(1).
Jiang et al., "A New Filtering and Smoothing Algorithm for Railway Track Surveying Based on Landmark and IMU/Odometer", Sensors, 2017, p. 1438, vol. 17, No. 6.
Karaim et al., "GNSS Error Sources", Multifunctional Operation and Application of GPS, 2018, pp. 69-85, Publisher: IntechOpen, Published in: London.
Lewis, R., "Track Geometry Recording and Usage at Network Rail", 2008, Published in: Derby.
Martey et al., "Track geometry big data analysis: A machine learning approach", IEEE International Conference on Big Data (Big Data), 2017, pp. 3800-3809.
Rabiner et al., "Theory and Applications of Digital Speech Processing", 2011, vol. 64, Published in: Upper Saddle River.
Reimer et al., "INS/GNSS/odometer data fusion in railway applications", 2016 DGON Inertial Sensors and Systems (ISS), 2016, pp. 1-14.
Rockwood et al., "Sequence Alignment by Cross-Correlation", Journal of Biomolecular Techniques (JBT), 2005, p. 453, vol. 16, No. 4.
Saab, "A map matching approach for train positioning. I. Development and analysis", IEEE Transactions on Vehicular Technology, 2000, pp. 467-475, vol. 49, No. 2.
Saab, "A Map Matching Approach for Train Positioning. II. Application and Experimentation", IEEE Transactions on Vehicular Technology, 2000, pp. 476-484, vol. 49, No. 2.
J. Sadeghi, "Development of Railway Track Geometry Indexes Based on Statistical Distribution of Geometry Data", Journal of Transportation Engineering, 2010, pp. 693-700, vol. 136, No. 8.
Sa et al., "Replacement Condition Detection of Railway Point Machines Using an Electric Current Sensor", Sensors, 2017, p. 263, vol. 17, No. 2.
Troxel et al., "Cross-Correlation between Cosmic Microwave Background Lensing and Galaxy Intrinsic Alignment as a Contaminant to Gravitational Lensing Cross-Correlated Probes of the Universe", Physical Review D, 2014, p. 063528, vol. 89, No. 6.
Wei et al., "Evaluating Degradation at Railway Crossings Using Axle Box Acceleration Measurements", Sensors, 2017, p. 2236, vol. 17, No. 10.
Eklof et al, "Novel Algorithm for Mutual Alignment of Railway Track Geometry Measurements", Journal of the Transportation Research Board, 2021.

* cited by examiner

Figure 4 Non-monotonic locations. Upper panel: Signal by location. Lower panel: Signal by Index Figure 5 Example of drift where different window sizes are needed for mutual alignment. Upper panel: Signal before alignment. Lowerpanel: Signal after alignment.

Figure 6 Estimated spatial error signals corresponding to Figure 3

Figure 7 Example of signal with two different aligned groups, and one erratic signal QueryFileDate 20190311. Upper panel: Signal before alignment. Lower panel: Signal after alignment.

MUTUAL ALIGNMENT OF RAIL GEOMETRY MEASUREMENTS

The disclosure relates to monitoring the condition of railway networks.

BACKGROUND

In order for railway networks to meet higher standards of service level and safety, condition monitoring and predictive maintenance are becoming increasingly important. Collection of track geometry data is an established procedure to facilitate evaluation of the functional condition and deterioration patterns of the railway track, or track system. Track geometry data are normally collected from sensors, either on dedicated track recording vehicles or on in-service vehicles. Sensor measurement indicators, techniques, and accuracy are well-studied and constantly improving topics. Some recent examples on advancements in the railway sector include replacement condition detection of railway points, degradation of railway crossings, image-based detection of track geo-metric parameters, fault diagnostics of railway axle bearings, image detection of fasteners, machine learning for analyzing the effect of geocell installation on track geometry quality, and novel filtering and smoothing algorithms for railway track surveying.

Rail or track geometry data, examples of which are given below, may indicate not only the condition of a rail or track but additionally or alternatively other parts of the rail or track system, for example but not limited to sleepers, ballast and other track system components as will be familiar to those skilled in this field.

Predictive models usually need data from condition monitoring runs at sequential points in time, to estimate deterioration patterns. This data usually needs to be aligned, for example to take account of inconsistencies between one measurement run and another. The challenges of data alignment are present for example in monitoring systems based on both tachometers and global navigation satellite systems (GNSS). For tachometers it has been noted that a slightly different wheel radius will cause an accumulation of distance errors. For GNSS-positioning, various sources of measurement errors occur, including, for example, clock-related errors, signal propagation errors, receive noise, signal jamming, and signal spoofing.

Previous studies have dealt with alignment of multiple signals in different ways. Common techniques to improve accuracy in positioning of condition measurements include data fusion between GNSS and INS (inertial navigation systems), on which there is extensive research. Another technique to identify the actual position of a train or measurement is map matching. Both of these methods can improve the position accuracy of a single run, and thus significantly simplify the process of mutually aligning several measurement runs. However, the problem of sufficient mutual alignment from a maintenance decision-making point of view remains.

To further improve alignment, post-processing algorithms can be imposed. In his dissertation, Faiz evaluates three different algorithms for mutually aligning track geometry data: distance alignment, fixed-window-based alignment, and parameter-based alignment. Faiz, R. B., E. Edirisinghe, and S. Singh in *An Empirical Rail Track Degradation Model Based on Predictive Analysis of Rail Profile and Track Geometry*. PhD thesis. Loughborough University, 2010 conclude that the latter provides the most accurate signal data alignment. The parameter-based alignment finds the closest match for each parameter value by incrementally shifting each parameter one row and calculating the minimum absolute error over time. This method works well when the signals have an overlap between different runs, but signal measurements from disjoint segments of a railway track will not be well aligned. As non-overlapping segments are very common in practice, an algorithm intended to work in a predictive maintenance setting needs to address this issue.

Bergquist, B., P. Süoderholm, O. Kauppila, and E. Vanhatalo in *Cleaning of Railway Track Measurement Data for Better Maintenance Decisions*. Proc., 5th International Workshop and Congress on eMaintenance. 2019, p. 9. conclude that pattern matching between runs, and then the use of the average location for all measurements, is a straightforward alignment algorithm in theory.

However, because of post-processing, measurement errors, differences in measurement equipment, and potential loss of data in the collection process, alignment in this fashion faces significant problems. They also propose that for regular maintenance, the exact location of point defects is not as important as monitoring deterioration of an extended segment.

The exact location of a defect is not a requirement for predictive maintenance. However it is desirable for an alignment algorithm to ensure a location estimate that is accurate enough to enable maintenance actions on the track. Some experts have concluded that current data are inaccurate, which has a negative impact on maintenance decisions.

SUMMARY

This summary is provided to introduce a selection of concepts in a simplified form that are further described below in the detailed description. This summary is not intended to identify key features or essential features of the claimed subject matter, nor is it intended to be used to determine the scope of the claimed subject matter.

In a first aspect there is provided in the following a method of aligning rail parameter measurements. The method may begin with receiving measurement data indicating variations in a parameter of the rail along the length of the rail. The measurement data may be derived from measurement runs performed at different points in time. Each item of measurement data may comprise a value for the parameter and an estimate of the location at which the parameter was measured. A signal corresponding to each measurement run is formed. Pairwise relative offsets are found between spatially overlapping segments in the signals corresponding to consecutive windows within the signals. For each signal and window the average relative offset to other signals is computed. Errors in the location estimates are determined based on the computed average relative offsets, and the determined errors may be used to refine the location estimates in the signal data.

This process may be repeated, for example until the mutual alignment meets one or more predetermined criteria, such as a pre-defined precision threshold.

Once the data has been aligned according to any of the methods described here, it may be used in the monitoring of the condition of a rail or a track or a system in which a rail or track is comprised.

An alert may be generated if the value of the parameter exceeds a predetermined threshold or is predicted to exceed a predetermined threshold within a predetermined period.

The method may be implemented as an algorithm, for example implemented on a computer. There is therefore also provided here a computer readable medium and a computing system for implementation of any of the methods described here.

In various examples of the disclosed technology, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Some examples are as follows:

Example 1, a method of aligning rail geometry parameter measurements comprising: receiving measurement data indicating variations in a parameter of the rail along the length of the rail derived from measurement runs performed at different points in time, each item of measurement data comprising a value for the parameter and an estimate of the location at which the parameter was measured; forming a signal corresponding to each measurement run; finding pairwise relative offsets between spatially overlapping segments in the signals corresponding to consecutive windows within the signals; for each signal and window computing the average relative offset to other signals; determining errors in the location estimates based on the computed average relative offsets; using the determined errors to refine the location estimates in the signal data.

Example 2, the method of Example 1 wherein if the determination of pairwise offsets fails to meet one or more criteria: repeating the finding pairwise offsets and computing average relative offset using a smaller window size, determining errors in the refined location estimates based on the newly computed average relative offsets, and using the newly determined errors to refine the location estimates in the signal data.

Example 3, the method of Example 2 comprising comprises repeating the finding pairwise offsets, determining errors and refining location estimates in successive iterations using a smaller window size until the alignment meets the one or more criteria.

Example 4, the method of any preceding Example wherein the determining of errors in the location estimates is computed by imposing that a weighted average within each window should be zero.

Example 5, the method of Example 4 where the weight depends on the distance from the nearest estimated relative offset.

Example 6, the method of any preceding Example in which the pairwise relative offsets are found using cross correlation.

Example 7, the method of any preceding Example comprising segmenting the data in each measurement run prior to the signal formation.

Example 8, the method of Example 7 wherein segmenting the data comprises segmenting the data between pairs of measurements that correspond to locations more than a predetermined distance apart.

Example 9, the method of any preceding Example wherein the signal forming comprises modelling the received measurement data as a continuous function of location.

Example 10, the method of Example comprising adjusting the estimated locations by imputing a fixed distance between estimated locations prior to the signal formation.

Example 11, the method of Example 2 wherein the one or more criteria comprise a pre-defined cross correlation threshold.

Example 12, a method of monitoring the condition of a rail track system comprising the method of aligning rail parameter measurements according to any preceding Example.

Example 13, the method of monitoring according to Example 12 comprising identifying a part of a rail as requiring maintenance if the parameter at that part exceeds or falls below a threshold.

Example 14, the method of Example 12 or 13 comprising predicting a value for the parameter for at least one future point in time based on past variations of the parameter over time.

Example 15, the method of Example 12, 13 or 14 comprising generating an alert if the value of the parameter exceeds a predetermined threshold or is predicted to exceed a predetermined threshold within a predetermined period.

Example 16, the method of any preceding Example wherein the measurement data relates to a track comprising a pair of rails and relates to one or more of cross level, gauge, horizontal profile and vertical profile.

Example 17, a computer readable medium comprising instructions which, when implemented in a processor in a computing system cause the system to perform a method of any preceding Example.

Example 18 a computer readable medium comprising instructions which, when implemented in a processor in a computing system cause the system to perform a method of aligning rail parameter measurements comprising receiving measurement data indicating variations in a parameter of the rail along the length of the rail derived from measurement runs performed at different points in time, each item of measurement data comprising a value for the parameter and an estimate of the location at which the parameter was measured; forming a signal corresponding to each measurement run; finding pairwise relative offsets between spatially overlapping segments in the signals corresponding to consecutive windows within the signals; for each signal and window computing the average relative offset to other signals; determining errors in the location estimates based on the computed average relative offsets; using the determined errors to refine the location estimates in the signal data.

Example 19, a computing system comprising a processor configured to perform a method of any preceding Example.

Example 20 a computing system comprising a processor configured to perform a method of aligning rail parameter measurements, the method comprising: receiving measurement data indicating variations in a parameter of the rail along the length of the rail derived from measurement runs performed at different points in time, each item of measurement data comprising a value for the parameter and an estimate of the location at which the parameter was measured; forming a signal corresponding to each measurement run; finding pairwise relative offsets between spatially overlapping segments in the signals corresponding to consecutive windows within the signals; for each signal and window computing the average relative offset to other signals; determining errors in the location estimates based on the computed average relative offsets; using the determined errors to refine the location estimates in the signal data.

Implementations of the described techniques may include hardware, a method or process, or computer software on a computer-accessible medium. Other embodiments of this aspect include corresponding computer systems, apparatus, and computer programs recorded on one or more computer storage devices, each configured to perform the actions of the methods.

BRIEF DESCRIPTION OF THE DRAWINGS

Embodiments will now be described, by way of example only and with reference to the following drawings, in which.

Figure 1:
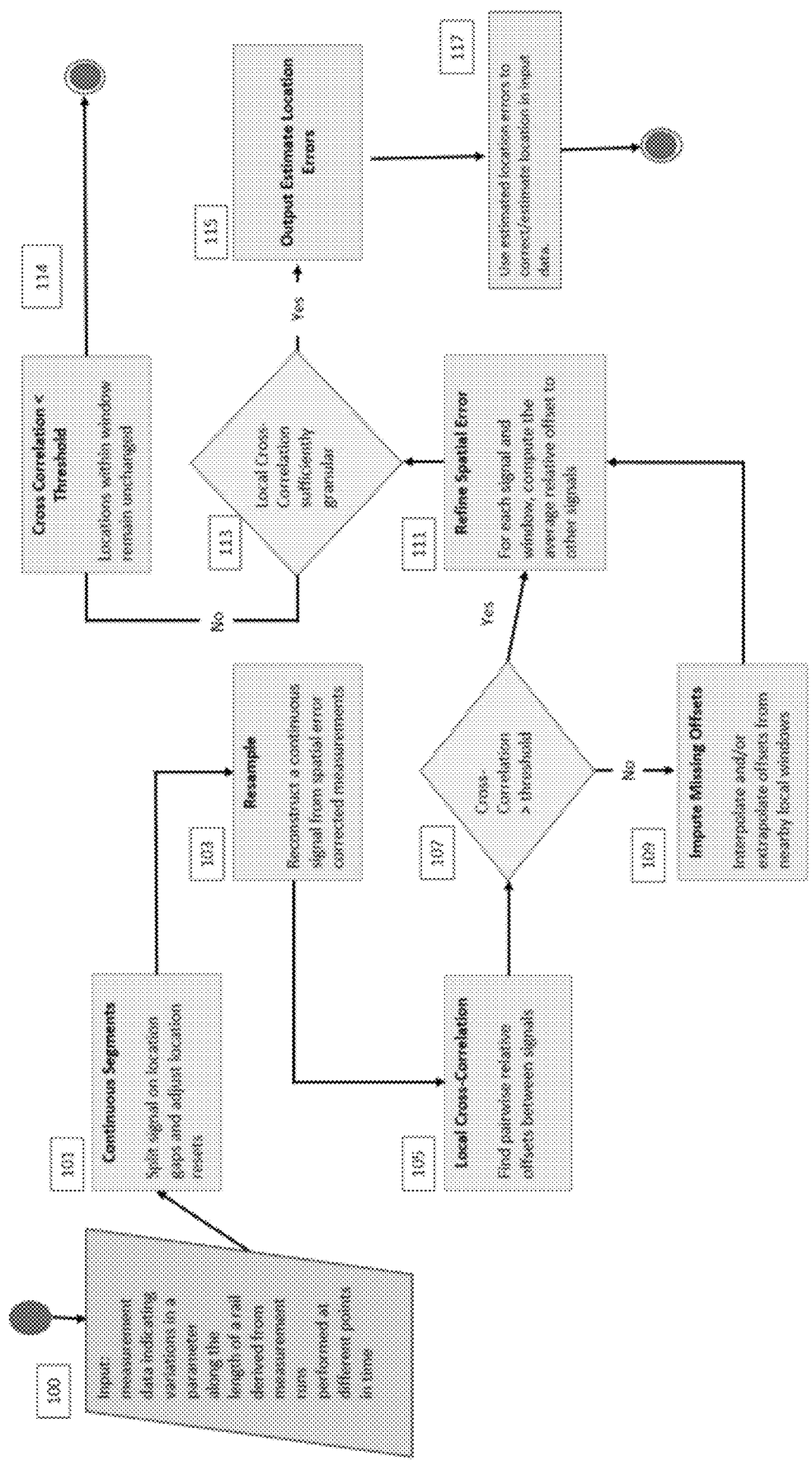
FIG. 1 is a flow chart of a method for alignment of parameter measurements.

Common reference numerals are used throughout the figures to indicate similar features.

DETAILED DESCRIPTION

Embodiments of the claimed subject matter are described below by way of example only. These examples represent the best ways of putting the claimed subject matter into practice that are currently known to the applicant although they are not the only ways in which this could be achieved.

A method of aligning rail parameter measurements will now be described, which may be implemented as a computer algorithm.

The algorithm may include one or more of the following novel aspects:
  alignment of highly segmented data, that is, aligning signals which do not necessarily have an overlap with other signals;
  alignment of data with variable sample rate;
  alignment of data with various aspects of measurement errors, spatial errors, missing locations, and missing measurements.
  alignment ensuring convergence toward the true location;
  alignment which is consistent over time, that is, data are aligned even after maintenance has occurred and changed the rail or track geometry.

In summary, the example algorithm described here presents a working method to align large amounts of rail or track geometry data, in spite of measurement errors and/or missing data which are common in practice. The algorithm addresses several issues pointed out in available literature, such as accuracy and practical feasibility.

The alignment method may be used as part of a method of monitoring the condition of a rail or track or a system in which they are comprised. This in turn may be used to identify one or more parts of a rail or track system that require maintenance, for example replacement or repair. A requirement for maintenance may be identified by a parameter exceeds or falls below a threshold. The identification may comprise generating an alert if a parameter at that part exceeds or falls below a threshold. Different alerts may be generated for different levels of requirement, for example the urgency of maintenance work. The different levels may correspond to different thresholds.

The method aims to resolve one or more previously intractable alignment problems including but not limited to: highly segmented data with variable sample rate, spatially correlated and uncorrelated measurement errors, convergence to true locations, and consistency over time.

The algorithm, described in further detail below with reference to the figures, may adjust spatial measurement errors by splitting signals into segments. The measurement data may have gaps where expected, e.g. regular, measurements are missing. These gaps may be used to define the start and end of segments. In other words the segments may be continuous or free from gaps. Re-sampled, error-corrected signals may be mutually aligned using cross correlation, and this process may be repeated, for example until the mutual alignment meets a pre-defined precision threshold. Missing measurement values may be handled by imputing an interpolated offset from nearby segments, ensuring that the signals remain continuous. By using weighted average offsets over all aligned signals, the law of large numbers guarantees convergence and consistency. The practical feasibility of the algorithm is demonstrated on empirical track geometry measurement data from the British railway network, owned and operated by Network Rail.

Data Material

The specific method described here with reference to the figures, which may be implemented as a computer algorithm, has been used to align real track geometry data from the British railway network, owned and operated by Network Rail. The example data was collected from Network Rail's Engineer's Line References (ELR) VTB3 1100, going from Earlswood mileage change to Brighton. Measurements were made between Jun. 26, 2017 and Jul. 1, 2019. In total, this dataset consists of 20 measurement runs, ranging from 2,047 m to 46,775 m in length.

The geometry data for rails or tracks may be collected in any suitable manner as will be known to those skilled in the art. For example, a rail network operator may operate a fleet of track recording vehicles, also known as measurement trains.

The measurement train will typically travel along a track length being monitored to obtain the track geometry measurements at regular intervals, for example monthly. Some service trains such as passenger and freight trains are being equipped to obtain this kind of measurement data which may then augment or replace data obtained from a measurement train. In general the measurement data being aligned in the methods described here may be derived from any suitable source and may relate to any track geometry parameter.

A rail vehicle usually travels on a pair of rails. Unless otherwise stated, in the following the term "track" is used to refer to a pair of rails. It should be noted however that some vehicles travel along single rails and any of the methods described here are applicable to alignment of single rail geometry data as well as to rail track geometry data.

The data obtained by a measurement vehicle may indicate deviations of a rail or track geometry parameter from an ideal condition, and/or its condition on installation. These are largely due to the use of the track by vehicles. As a result of the rail and vehicle geometry some track geometry parameters are periodical in nature, with one or more frequencies being related to the geometry of a specific track.

An example is variation in track height caused by the phenomenon known as cyclic top which can lead to degradation requiring maintenance. The methods of alignment of measurement data described here may be used in the monitoring of cyclic top and other variations in track geometry parameters that may require attention.

A method may therefore begin with the receipt of measurement data indicating variations in a parameter along the length of a rail derived from measurement runs performed at different points in time. Each item of measurement data may comprise a value for the parameter and a location, or estimated location. The combination of parameter value and corresponding location estimate is sometimes referred to here as an "observation".

The measurement data may be pre-processed, for example to derive or improve the estimated location. This may be done in various ways. One process uses data fusion between an onboard RTPS (real time positioning system) and map matching. The RTPS may comprise a D-GPS (differential global positioning system), inertial measurement unit, and tachometer, all of which may be onboard a measurement vehicle for example. Spatial positions of each measurement run may be derived and map matched to an integrated network map, the route setting (RS) files, providing information about the route. The reference RS files may not align fully to the RTPS which can cause inaccurate distances.

Because measurement vehicle layout is different, the reference position of each track geometry system and RTPS varies between vehicles. In practice, trains running in the same orientation show a more consistent alignment when data is overlaid. However, recordings of the same section of track result in locations varying several meters between runs from the same vehicle running in a different orientation, or different vehicles in running in different orientations.

In a typical set up, track geometry measurements are spatially sampled approximately every 200 mm by a tachometer which is independent of the GPS providing its location. Each data point receives an applied position that may or may not equate to 200 mm due to inaccuracies or other reasons explained further below. Recording vehicles may also have different tachometer counts, causing initial unpredictable drifts, which the RTPS may try to compensate for. The GPS-positioning typically adjusts the location continuously, which means it sometimes re-adjusts locations, causing visual overlaps in the signal measurements.

Table 1 describes nine track geometry parameters, any of which may be aligned using the algorithm described here. The methods described here are not limited to these parameters and they may be used to align other rail geometry parameters such as those known to those skilled in the art. Further, the methods described here may be used to align other kinds of data and may not be limited to geometry measurements.

TABLE 1

| Parameter | Geometric Feature | Description |
| --- | --- | --- |
| Twist 3 m | Crosslevel | Height of the left rail above the right rail, measured over 3 m in the transverse vertical plane along the track direction. |
| Alignment mean 35 m | Horizontal profile | Track center-line profile defined as the variation from the design profile in the horizontal plane normal to the tangent, filtered to only include wavelengths less than 35 m. |
| Alignment mean 70 m | Horizontal profile | Track center-line profile defined as the variation from the design profile in the horizontal plane normal to the tangent, filtered to only include wavelengths less than 70 m. |
| Gauge | Gauge | Distance between the inside faces of the rail heads, measured at a fixed distance from a straight line joining the highest points of each rail. |
| Top mean 70 m | Vertical profile | Railhead profile in the longitudinal vertical plane. Combined measure for left and right, filtered to include only wavelengths less than 70 m. |
| Top right 35 m | Vertical profile | Right railhead profile in the longitudinal vertical plane, filtered to include only wavelengths less than 35 m. |
| Top left 35 m | Vertical profile | Left railhead profile in the longitudinal vertical plane, filtered to include only wavelengths less than 35 m. |
| Dipped joint left | Vertical profile | Detected from a derived ramp angle of the vertical profile at bolted joints on left rail. |
| Dipped joint right | Vertical profile | Detected from a derived ramp angle of the vertical profile at bolted joints on right rail. |

FIG. 1 is a flow chart of a method for alignment of parameter measurements, which may be implemented in a computer algorithm. The method of FIG. 1 may be used as part of a method of monitoring the condition of a rail track or system or may have other applications. Examples of alignment performance using this algorithm are described with reference to FIGS. 4 to 7.

The method may begin with receiving measurement data as indicated at 100 in FIG. 1. The measurement data may indicate variations in a parameter of a rail along the length of the rail derived from measurement runs performed at different points in time.

Sampling

A signal may be formed corresponding to each measurement run to normalise the input data. For example, the true signal sampled by the track measurement equipment may be modeled as a continuous function of location $\hat{y}(\hat{x})$, and band-limited with an upper bound of $f_s/2$. This signal may then be resampled as indicated at operation 103 in FIG. 1, for example piecewise sampled at an approximate sample rate $f_s$ in a series of observations or measurements (x[i], y[i]), i∈N with errors in both value measurement γ[i] and spatial measurement ϵ[i]:

$$\hat{y}(x[i]-\epsilon[i])=y[i]-\gamma[i]=\tilde{y}[i] \tag{1}$$

Thus a continuous signal may be reconstructed. The measurement data may have undergone spatial error correction in operation 101 described below.

Repeated measurements form a time series of signals $\hat{y}_1(\hat{x})$, $\hat{y}_2(\hat{x})$, ... where signals that correspond to the same location, e.g. overlapping segments, can describe degradation in railway track geometry over time. The method described here estimates the spatial measurement error $\hat{\epsilon}$ to mutually align signals. It is assumed that errors in value measurement $\gamma=y-\hat{y}$ are iid (independent identically distributed) and make no attempts at estimating them are made here.

The signal of every track geometry parameter is sampled unevenly, and with occasional spatial gaps between measurements. The spatial measurement errors $\epsilon$ have a tendency to drift and are thus spatially correlated. The spatial errors can also make sudden smaller jumps without breaking the continuity of the modeled signal $\hat{y}$.

Continuous Segments

To simplify processing and notation, at operation 101 prior to resampling at operation 103 a sampled signal, e.g. measurement data from a measurement run, may be segmented, e.g. split into segments that correspond to lengths of track. This is illustrated schematically in FIG. 2 with an example of a track geometry recording.

A track geometry recording can have one or more engineer's line references "ELR", with one or more Track IDs associated with an ELR. A route is coded using an ELR code (for instance LTN1—London to Norwich 1, AAV—Ascot to Ash Vale, etc). Therefore, within a route there are tracks that may be referred to by track Ids (1100 represents Up Fast, 3100—Reversible Fast, there are several tens of types of Track Id). Each record for the ELR/TrackID combination has a meterage associated with it (each record has, roughly, 200 mm spatial separation from the previous and next record). Thus the record corresponds to the value measurement and the meterage corresponds to the spatial measurement or location.

Then continuous pieces of the full continuous signal may be modelled. In each a segment a zeroth order location estimate $\hat{x}_0$ has a step size that approximately corresponds to the sample rate $f_s$.

$$\Delta\hat{x}_0[i] \approx 1/f_s \quad (2)$$

$$\hat{x}_0[i] = x[i] - \hat{\epsilon}[i] \quad (3)$$

where $\Delta x[i]$ is defined as the forward finite difference:

$$\Delta x[i] := x[i+1] - x[i] \quad (4)$$

Gaps

Figure 2:
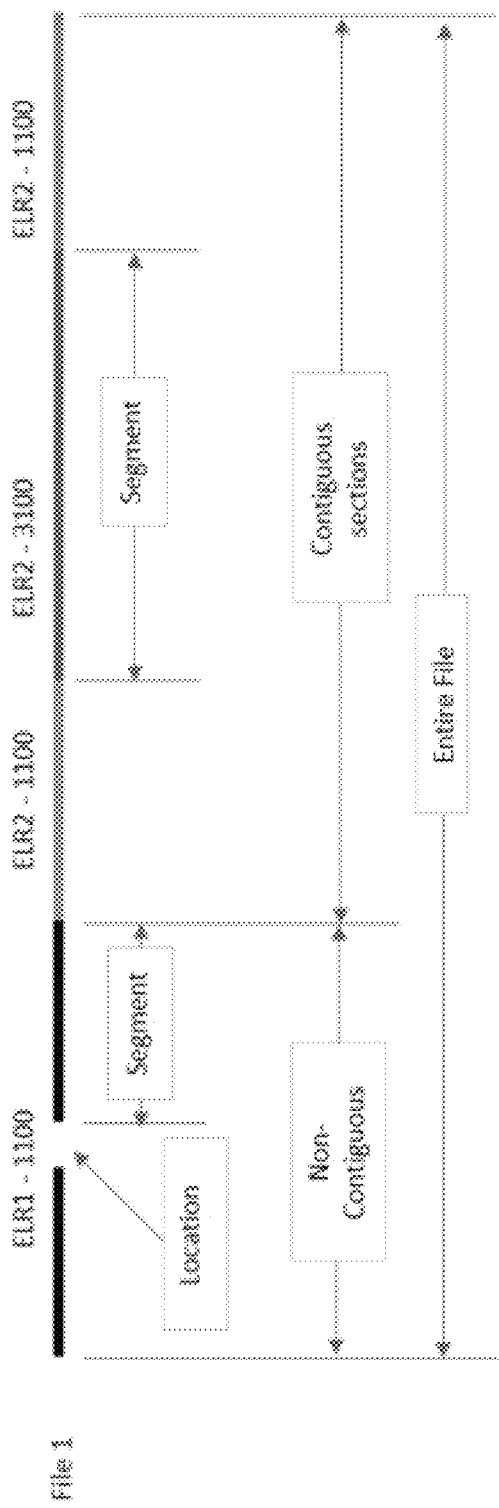
FIG. 2 is a schematic diagram illustrating segmentation of data.

Segments may be defined by the measurement data in them being contiguous. A segment may therefore correspond to a complete track or part of a track. In FIG. 2 it can be seen that there is a gap in the data from track ELR-1100 and therefore two segments may correspond to this track. A gap may be defined as more than a predetermined number of measurement points, e.g. 20 points corresponding to 4 metres.

To put this mathematically, a sample may have gaps that are not explicitly marked in a sequence of measurements. Such gaps can, however, be identified by verifying that the distance to the next location is much greater than expected with inequality 5 or more specifically inequality 6:

$$\Delta x[i] \gg 1/f_s \quad (5)$$

$$\Delta x[i] > T_g \quad (6)$$

where $T_g$ is a threshold configuration parameter that may be used to define where a sample signal is split into segments representing a continuous piece of the signal.

In other words the data may be segmented, or split between pairs of measurements that correspond to locations more than a predetermined distance apart. In the following is assumed that a sample x has no gaps.

Location Resets

Figure 4:
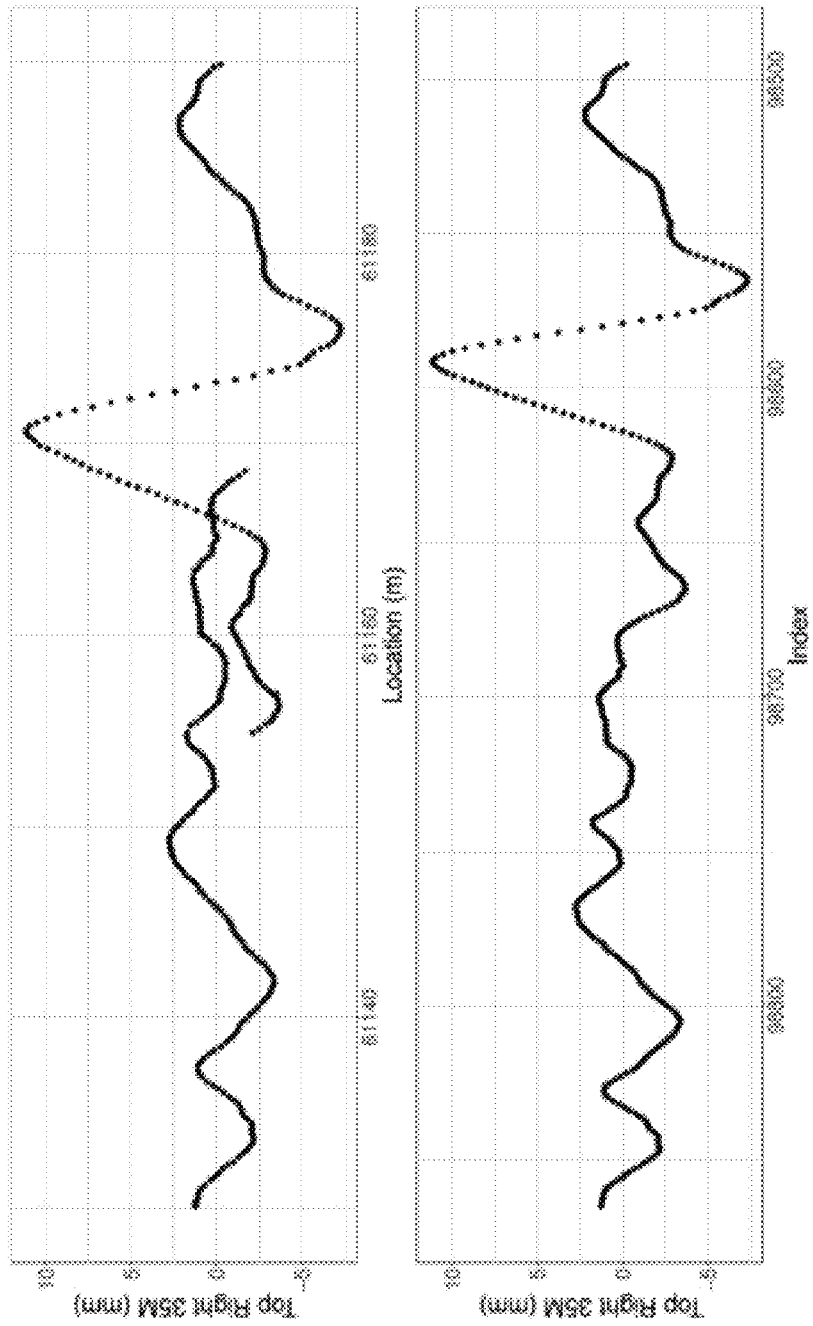
FIG. 4 shows two graphs illustrating the effect of location resets on measurement data.

The location information in the measurement data may contain resets and the estimated locations in the received measurement data may be adjusted for these resets at operation 101. In a track measurement vehicle for example, as the tachometer sequentially samples a signal y, the RTPS records the location x. The RTPS has a correction mechanism that periodically resets the location, which may cause sudden jumps in the location sequence even though the track recording vehicle is steadily moving in one direction (see detailed description in the Materials and Methods section). Such jumps are characterized by an unexpected distance between two consecutive observations (Inequality 7). These sudden jumps can even make the measurement locations non-monotonic ($\Delta x[i]<0$) as illustrated in FIG. 4.

$$\Delta x[i] \napprox 1/f_s \quad (7)$$

When the situation represented by Inequality 7 is detected a fixed step size, e.g. a fixed distance between estimated locations, may be is imputed in the estimated location:

$$\Delta\hat{x}[i] \approx 1/f_s$$

$$\Delta\hat{x}[i] = \begin{cases} \Delta x[i], & \text{if } \Delta x[i] \approx 1/f_s \\ 1/f_s \end{cases}$$

This implies that the estimated error $\hat{\epsilon}[i]$ at each observation i affects the next error estimate $\hat{\epsilon}[i+1]$.

$$\Delta x[i] \napprox 1/f_s \Rightarrow$$

$$\Delta\hat{x}[i] = 1/f_s \Leftrightarrow$$

$$\Delta x[i] - \Delta\hat{\epsilon}[i] = 1/f_s \Leftrightarrow$$

$$\Delta\hat{\epsilon}[i] = \Delta x[i] - 1/f_s \Leftrightarrow$$

$$\hat{\epsilon}[i+1] - \hat{\epsilon}[i] = \Delta x[i] - 1/f_s \Leftrightarrow$$

$$\hat{\epsilon}[i+1] = \hat{\epsilon}[i] + \Delta x[i] - 1/f_s \quad (8)$$

An estimated location $\hat{x}$ is constructed by recursively adding up potentially adjusted errors in both the forward direction $\hat{\epsilon}_f$ and the backward direction $\hat{\epsilon}_b$. No assumption is made about whether the position is more accurate before or after a position reset, or even if the value before or after is the new location reset by the RTPS.

$$\hat{\epsilon}_f[i+1] = \hat{\epsilon}_f[i] + \begin{cases} 0 & \Delta x[i] \approx 1/f_s \\ \Delta x[i] - 1/f_s \end{cases} \quad (9)$$

$$\hat{\epsilon}_f[0] = 0$$

$$\hat{\epsilon} = \frac{\hat{\epsilon}_f + \hat{\epsilon}_b}{2}$$

$$\hat{\epsilon}_f[i+1] = \hat{\epsilon}_f[i] - \begin{cases} 0 & \Delta\hat{\epsilon}[i] \approx 1/f_s \\ \Delta x[i] \end{cases}$$

$$\hat{\epsilon}_f[0] = 0$$

-continued $$\hat{\epsilon} = \frac{\hat{\epsilon}_f + \hat{\epsilon}_b}{2}$$

Since the operation is symmetric, the average error is $\bar{\epsilon}=0$. In the following it is assumed that a sample x has no position resets. Therefore the input to operation 103 may be cleansed and monotonic normalised data for one or more parameter types (e.g. track geometry parameters Top Left, Top Right, Alignment, Gauge, Twist and Dip). The spatial error correction at operation 103 may refer to correction for e.g. location resets.

Prior to or after the resampling at operation 103, the input data may be compared to find suitable matches for cross correlation. The cross correlation is then performed in order to find pairwise offsets between signals that can be used for location correction. Other techniques for offset determination may be used.

Convergence to True Location

Repeated samples $(x_1y_1)$, $(x_2, y_2)$, . . . , $(x_\infty, y_\infty)$ are independent.

According to the law of large numbers, the average spatial error signal $\epsilon$ tends to 0 for any given location $\hat{x}$ as the number of independent sample signals increases.

$$\frac{1}{n}\sum_{i}^{n}\hat{\epsilon}_i(\hat{x}) = 0 \qquad (10)$$

Drift

Consecutive measurements in a given sample $x_k[0]$, $x_k[1]$, $x_k[\ldots]$ are, however, not independent. Their spatial errors $\hat{\epsilon}_k[i]$ are strongly correlated and create a band-limited signal that drifts slowly (Inequality 11) and smoothly with an upper frequency bound $f_d$ (Inequality 12). Further an absolute upper bound on the largest drift possible is assumed (Inequality 13).

$$\left|\frac{d}{dx}\hat{\epsilon}(x)\right| \ll 1 \qquad (11)$$

$$f_d \ll f_s \qquad (12)$$

$$|\hat{\epsilon}| < T_d \qquad (13)$$

These restrictions let us start with a coarse local alignment of the samples based on the largest drift possible (Inequality 13) and refine details (Inequality 12) with increasingly local (Inequality 11) alignment steps. This increased localisation is achieved in this example with progressively smaller windows for relative offset determination. It will be understood that the windows may be subdivisions of a segment. The following describes an iterative process but an alternative method might pre-determine an appropriate window size to avoid the need for successive iterations. The window size need not be constant along the length of a segment. In other words, different window sizes may be optimum for different segments, or even different portions of a segment.

A drift that changes with frequency f and amplitude a will oscillate from −a to a over the distance ½f A local alignment window thus needs to be shorter than ½f to detect a drift of frequency f. Inequality 11 ensures that larger changes in drift have lower frequencies. Higher frequency drifts can be found in small local windows; that is, it is not necessary to search for potential drifts further away in other signals than the length of the alignment window.

Cross Correlation

The offset between two signals, e.g. signals corresponding to the same or overlapping segments in different measurement runs, may be found through cross correlation, a standard signal processing technique to search for similarity between signals which has been used extensively in various fields. Some examples from a wide variety of topics are high-speed sampling oscilloscopes, DNA sequence alignment, identifying street poles from images, and alignment of cosmic waves.

At operation 105 in FIG. 1 pairwise relative offsets are found between spatially overlapping segments in the signals. In a first iteration of operation 105 this may be performed for a first window within overlapping segments, optionally but not necessary the first window in a particular direction.

A simple example is illustrated in FIG. 2 for a window size which corresponds to four measure points. The cross correlation may be simplified by filling a predefined grid with the measured value for each normalized measure point. An offset matrix may be created by calculating what offset for each window gives the best correlation (highest dot sum score in FIG. 2) between the latest measurement run and the previous run. In the example of FIG. 2, a −2 offset results in highest correlation. An example offset matrix including additional results for different offsets in FIG. 2 are given in table 2 below:

TABLE 2

| Offset | −3 | −2 | −1 | 0 | 1 | 2 | 3 |
|---|---|---|---|---|---|---|---|
| Dot Sum Score | 247 | 267 | 233 | 183 | 119 | 104 | 107 |

In practice, a defined window length may comprise 2^11 (2048) measure points.

For continuous signals f and g, the cross correlation is defined as:

$$(f \star g)(\tau) \triangleq \int_{-\infty}^{\infty} \overline{f(t)}g(t+\tau)dt \qquad (14)$$

where $\overline{f(t)}$ is defined as the complex conjugate of f(t) and τ is the displacement or lag of the signals; that is, a feature in f at t occurs in g at t+τ.

For signals measured at discrete points f and g, the cross correlation is defined as:

$$(f \star g)(n) \triangleq \sum_{m=-\infty}^{\infty} \overline{f[m]}g[m+n] \qquad (15)$$

where $\overline{f[m]}$ is defined as the complex conjugate of f[m] and n is the displacement or lag of the signals; that is, a feature in f at m occurs in g at m+n.

If the offset determination meets one or more predetermined criteria, for example if the autocorrelation function (ACF) produced by cross correlation exceeds a threshold for the window such as 0.75, an offset may be assigned to the signal or measurement run for that particular window. If this threshold is not met, the cross correlation may be repeated for smaller and smaller window sizes, for example the window size may be halved at each iteration in order of 2^10, 2^9, 2^8, 2^7 and 2^6 measure points. A minimum window size may be imposed. For some windows it may not be possible to achieve the required criteria, e.g. correlation threshold.

Alignment

An iteration of alignment starts by reconstructing an estimated signal at operation 103 as described above. Let y(x) denote a continuous signal reconstructed from spatially error-corrected measurements:

$$y(x[i]-e_j)=y[i] \quad (16)$$

The reconstructed signal is undefined for all x where the nearest sampled observation is further away than Tg. Reconstructed signals are then pairwise compared at 105 in FIG. 1 using local cross correlations to find relative offsets. Let $o_{u,v}[i]$ denote the estimated relative offset between two signals u and v at window W[i].

$$o_{u,v}[i] = \arg\max_{\tau}(W_i\hat{y}_u \star W_i\hat{y}_v)(\tau) \quad (17)$$

A discrete approximation of this function uses a sample rate fs for the function y(x) and interpolates the maximum of the cross correlation with a two-degree polynomial at the discrete arg max and its two neighbors.

The estimated relative offset o is undefined if the maximum correlation is less than a pre-defined threshold $T_p$, or if either of $y_u$ or $y_v$ is undefined within the window. For each o let d be the distance to the nearest defined offset, with d=0 if the corresponding offset o is defined.

The estimated relative offset may be determined not to be defined only after iterations of operation 105 with multiple progressively smaller window sizes. In that case offsets may be imputed to some windows at operation 109.

Imputation

Let ȯ be an imputed offset that interpolates from nearby windows where o is undefined. ȯ has a corresponding weight w=max(0, 1−d/$T_d$). Let the (j+1)th estimated drift error be the weighted mean of the relative offsets:

$$\hat{\epsilon}_u^{j+1} = \hat{\epsilon}_u^j + \frac{\sum_v \dot{o}_{u,v}^j w_{u,v}^j}{2\sum_v w_{u,v}^j} \quad (18)$$

with $\hat{\epsilon}_u^{j+1}=0$ if $\Sigma_v w_{u,v}^j=0$. $\hat{\epsilon}_u=\hat{\epsilon}_u^j$ denotes the estimated location error for measurement u. The aligned signals are then reconstructed from $$y-\gamma=\hat{y}(\hat{x})=\hat{y}(x-\hat{\epsilon})$$

As shown in FIG. 1, the imputation of missing offsets at operation 109 may take place only if the cross correlation value, obtained for example according to equation (15) is determined at decision 107 to be below a predetermined threshold even using the minimum window size. In other words, several iterations of operation 105 with different window sizes may take place prior to decision 107.

Operations 105 and 107 may be performed for the whole segment, for example for consecutive windows which need not be of equal length, prior to subsequent operations. Alternatively operations 105 and 107 may be performed for only part of a segment, for example one window, before the process continues.

Refinement of Spatial Error Estimate

At operation 111 a refined spatial error, may be determined. For each signal and window the average relative offset relative to other signals may be computed. Errors in the location estimates of the measurement data may then be determined based on the computed averages. These may be used at operation 117 to refine the location estimates in the signal data.

In a specific example, the refined spatial error E can then be estimated for each sample by imposing that a weighted average within each window should still be 0 (Equation 10—the average spatial error tends to 0 for any given location as the number of independent samples), where the weight depends on the distance from the nearest estimated relative offset.

In an example process:

Only windows where the autocorrelation function (ACF) produced by cross correlation exceeds 0.75 are assigned an offset. If this threshold is not met, the locations within the window remain unaligned.

For each new window that is aligned, the previous offset matrix is extracted (i.e. what the offset matrix looked like before this window was added).

Create offset weights. These weights show how much impact the addition of the latest window has had on the alignment. If a query run has an offset for a particular window, the weight for that offset is one. For windows with no data, the weight is extrapolated towards zero.

Expand and smooth the offset matrix using the weight matrix. The smoothing is done to keep consistency between the windows, since they are cross correlated independently.

Expand and smooth the previous offset matrix.

Combine the new and the previous smoothed offset matrices. This ensures that the normalized locations are as stable as possible between different runs of the algorithm. The combined smoothed offset matrix describes the mean offset between each query and all other queries, hence providing an estimate of the true location of each window in each query.

The estimate of the true offset is interpolated to fit each location in each query run.

To adjust the alignment to the different parameters, a constant offset is calculated using one iteration of the cross correlation process. This constant offset is assumed to be the same for each parameter over one entire query. The constant offset for each parameter and query is added to the estimated locations of each window belonging to that query.

Alternatively this may be expressed mathematically as follows:

For windows without any relative offsets, interpolation may be from the nearest relative offsets. At the edges, the first and last values may be extrapolated.

$$r[i] = \frac{\sum_{j,k} \hat{\epsilon}_{j,k}[i] w_{j,k}[i]}{\sum_{jk} w_{j,k}[i]} \quad (19)$$

-continued $$\hat{e}[i] = \left(\sum_{j,J} o_{j,k}[i] - r_w\right)/2 \quad (20)$$

$$\hat{\epsilon}_j = \hat{\epsilon}_j + \hat{e}[i] \quad (21)$$

The refined spatial errors may be estimated through iterating with half the window size until the window is small enough to capture the fastest changes in drift that are of interest (Inequality 11).

In other words, additionally or alternatively to iterating through different window sizes to reach the cross correlation threshold at operation 107, further iterations of window size may take place as part of operation 111.

A decision is made at operation 113 whether the local cross correlation is sufficiently granular or meets other correlation or offset criteria. This may be on a window by window basis similar to operation 111 but now performed on windows with missing offsets imputed. It may be that even after imputation a measurement run is an outlier, in which case locations within that window are not refined, as indicated at operation 114.

For windows that meets one or more criteria such as a correlation threshold, the resulting estimated location errors may be output at operation 115. They may then be used to correct or refine the location estimates in the input data at operation 117. In a specific example, the output may be an aligned data filed produced for each ELR and Track ID section which includes each measure point with the aligned location information.

Results—Case Study

Figure 3:
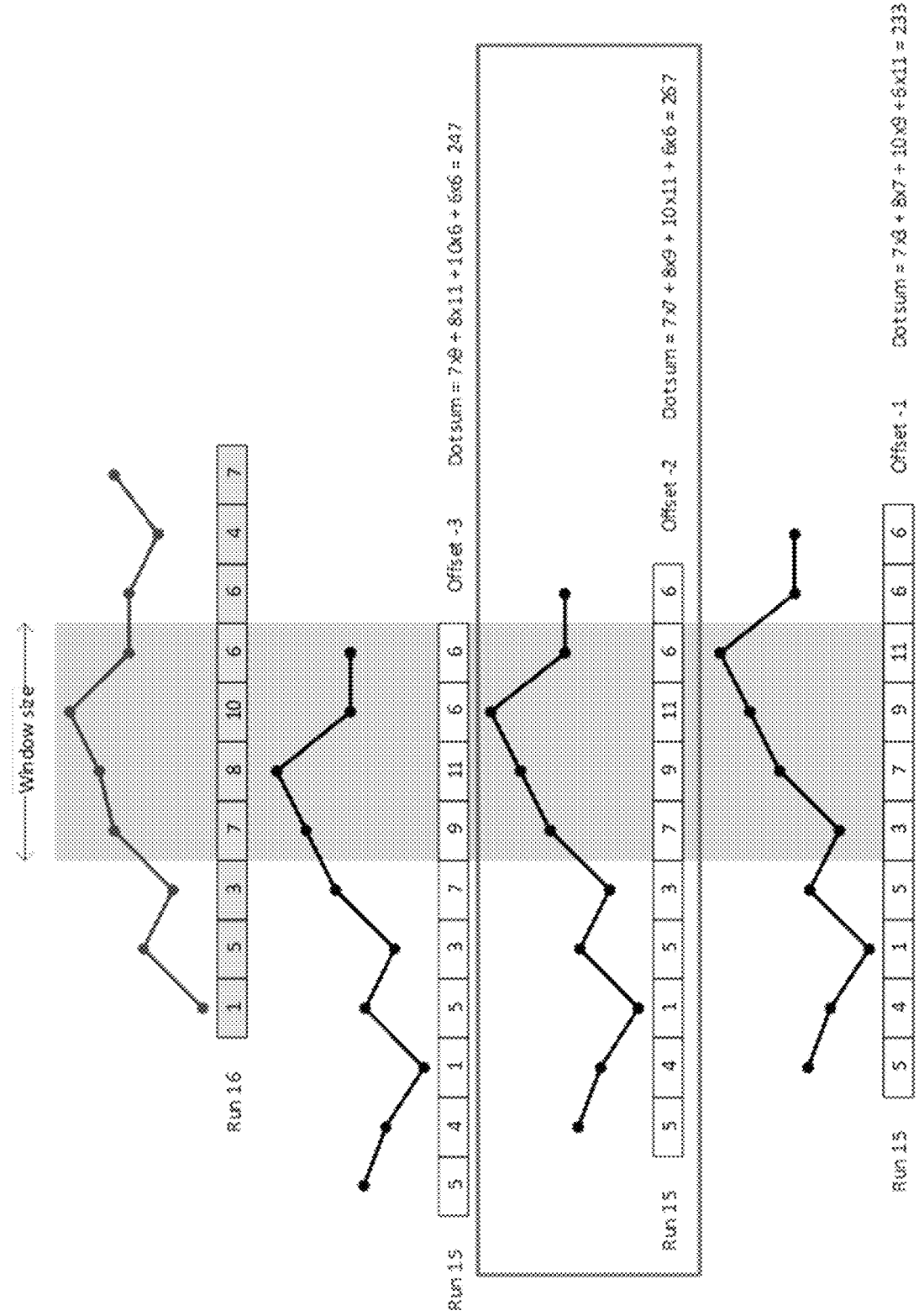
FIG. 3 is a schematic diagram illustrating cross correlation of data from two measurement
runs to estimate the offset between runs.

The visual alignment is how the end user perceives the performance of the algorithm. FIG. 3 shows an alignment of a track geometry parameter where multiple window sizes are needed to mutually align the signals. QueryFileDate represents the date of the track measurement in the format yyyymmdd. Measurement running 20170526 to 20190114 have a drift of approximately 15 m, but the locations of the measurements from 20190211 drift approximately 60 m from the other runs.

Figure 5:
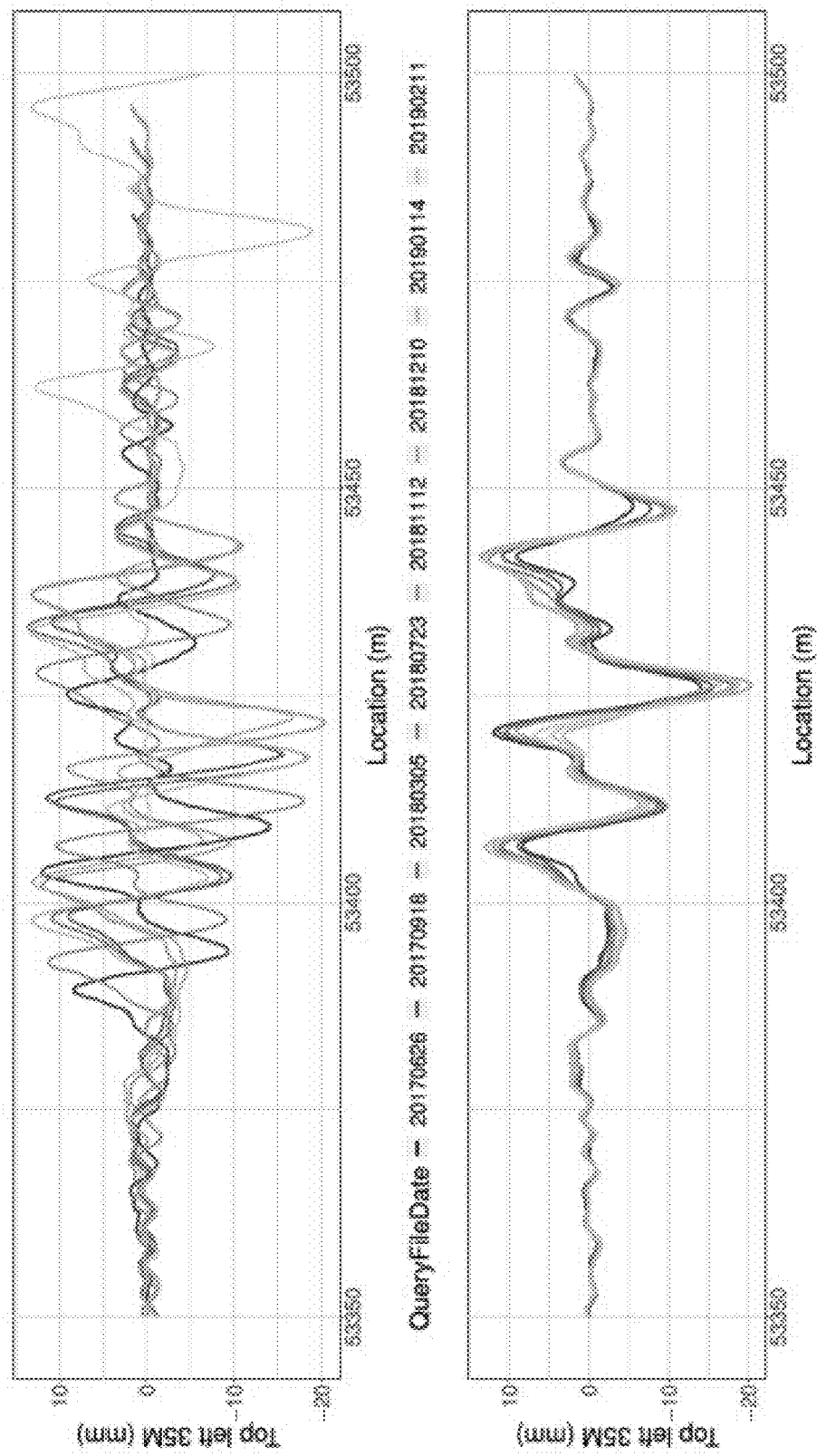
FIG. 5 shows graphs of measurement run signals before and after alignment multiple window sizes are used to mutually align the signals.
Figure 6:
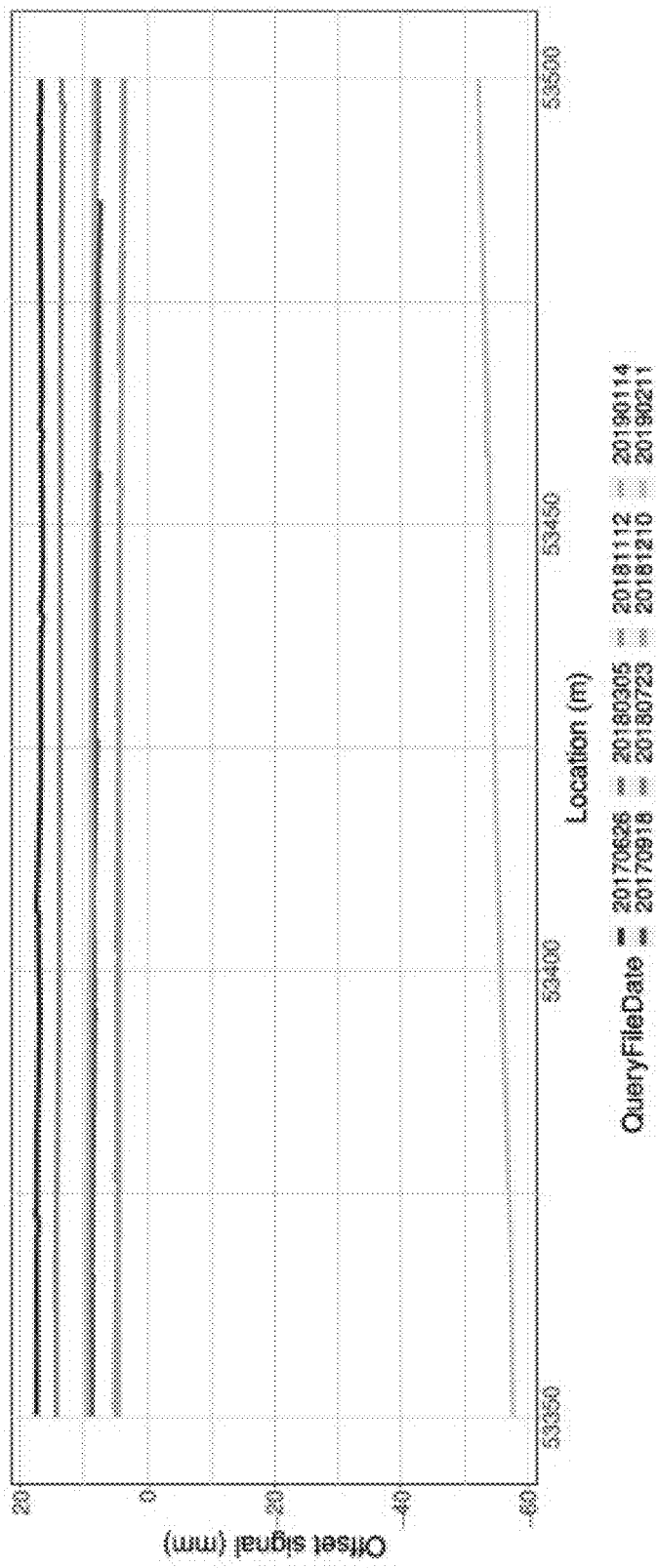
FIG. 6 shows the estimated spatial error signals for the alignment shown in FIG. 3.
Figure 7:
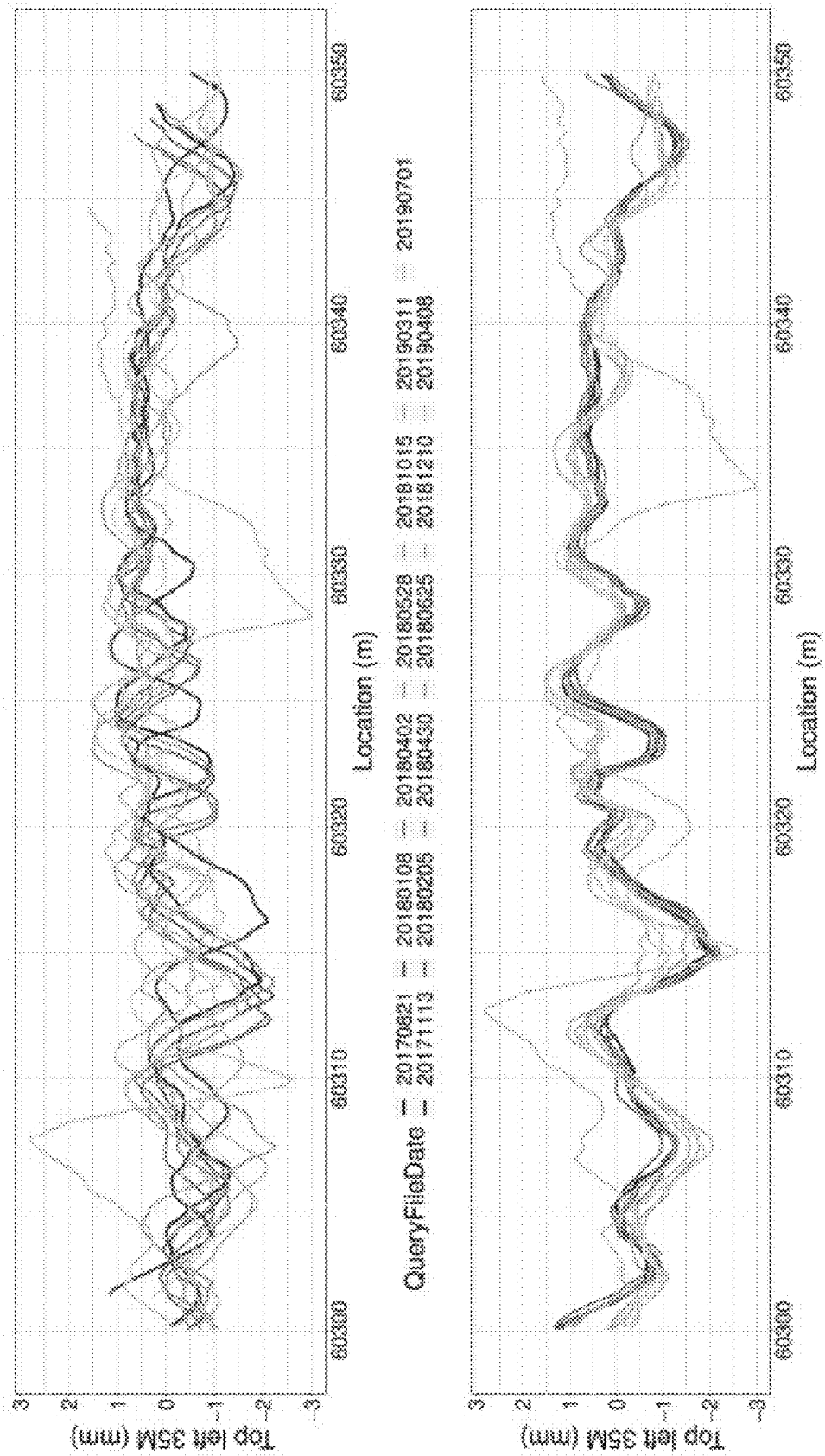
FIG. 7 shows an example of algorithm performance when the measurements of a track geometry parameter have a heterogeneous behavior.

FIG. 4 shows the estimated spatial error signal for the alignment shown in FIG. 5. The offsets for the different measurement runs differ between 5 and 60 m. FIG. 7 shows an example of algorithm performance when the measurements of a track geometry parameter have a heterogeneous behavior, possibly because of maintenance activities. Measurements from 20170821 to 20180528 are well aligned, while another group of measurements from 20180625 to 20190701 show a different behavior. A possibly incorrect signal, measured on 20190311, is not well aligned to either of the groups. In the lower panel of FIG. 7, showing the measurements before alignment, it is almost impossible to distinguish different signal behaviors.

The accuracy of error estimation is improved with increasing amounts of data. For track geometry data it would be typical to use data from 12 measurement runs since the data is typically collected monthly and therefore this corresponds to a year's worth of data.

Discussion

Five challenging and previously unresolved aspects of mutually aligning track geometry signal data were stated in the Introduction: segmented data, variable sample rate, measurement errors, convergence to true locations, and consistency. This section discusses how the algorithm described here addresses each one of these aspects.

Aligning Segmented Data

Aligning signals with cross correlation requires evenly sampled signals, equal in length. As shown in the section on Materials and Methods, measurement runs can range from 2,000 up to 47,000 m in length and not all runs may overlap.

By splitting each measurement run into continuous pieces, local cross correlation can be used to calculate the offset between pairwise continuous windows of two signals. For windows where the offset is undefined, that is, segments with no continuous overlap between signals, imputed offsets interpolated from nearby windows ensure that the estimated spatial error signal is continuous.

The case study described here demonstrates that the mutual alignment algorithm works on realistic, empirical railway infrastructure data (17). Because measurement runs often differ in length and there may not be overlap between runs, an algorithm for mutual alignment must address this issue to be useful in practice. The proposed algorithm successfully aligns segmented, empirical data with a very high precision in the alignment.

Variable Sample Rate

As described in section on Materials and Methods, the sample rate of the track geometry parameters measured by a tachometer is 200 mm. However, the GPS does not match the locations exactly to the tachometer sample rate. This mismatch must be adjusted to allow mutual alignment between signals.

Location resets in the RTPS causing mismatches between the track geometry parameter and locations are handled by creating an estimated location without resets. With resets removed, an accurate representation of the signal with one location per track geometry measurement point is achieved.

Measurement Errors

The algorithm identifies spatial gaps in the sample signal and splits the signal into continuous pieces accordingly. Imputation of offsets (as described in the subsection Imputation) ensures that the signal is spatially correlated over the entire measurement run, despite the gaps.

The drift between measurement runs, that is, the spatially correlated measurement errors, is adjusted using an incremental reduction of local cross correlation windows. As seen in FIG. 5, the drift varies vastly between different runs. At the same time, the precision of the alignment needs to be high enough to identify deterioration in the track geometry parameters. By iterating the algorithm using smaller cross correlation windows until sufficient granularity of the alignment is achieved (FIG. 1), the proposed algorithm can mutually align signals with large drifts as well as obtain any desired level of precision.

Measurement errors in the track geometry parameters are not addressed by the algorithm. However, as can be seen in FIG. 7, the alignment allows for erratic or incorrect signals to be identified. If the pre-defined correlation threshold is not met (see the section on Alignment), the offset of the estimated spatial error for that window is imputed from the nearest neighboring window. This procedure ensures that signals suffering from large measurement errors in the track geometry parameters will not affect the accuracy of the mutual alignment, and inaccurate measurements are more easily distinguished from accurate measurements.

Consistency

The railway track undergoes regular maintenance activities which are reflected in the measurements of the track geometry parameters. A static alignment algorithm, that is, aligning signals to a fixed reference, will inevitably cause inconsistencies when maintenance actions change the geometry of the track.

To achieve an alignment that is consistent over time, the algorithm must be able to update the alignment dynamically. When the track geometry parameters change because of maintenance, a new series of mutually aligned signals will occur, as seen in FIG. 7.

Our algorithm attains consistency through two different steps. First, it imposes a threshold of each local cross correlation. This ensures that when the signal of a track geometry parameter changes characteristic because of maintenance, it is mutually aligned with other signals exhibiting a similar pattern. Second, the refinement of the estimated spatial error ensures that different groups of mutually aligned signals have an accurate location. By setting the sum of a weighted average over all windows to zero (as described in the section Refinement of Spatial Error Estimate), the estimated locations are consistent over time despite maintenance activities taking place.

In a production setting, consistency is maintained by running the alignment algorithm each time a new measurement run is added to the database.

Limitations

The law of large numbers implies that a sufficient amount of data must be aligned to ensure convergence. With only a few measurement runs, convergence to true locations cannot be guaranteed. The algorithm does not use fixed reference points, which is an advantage in terms of flexibility. However, in certain practical applications, for example, when compiling several geospatial data sources, fixed references might sometimes be required. This can be achieved by fixing the algorithm at a specific alignment, but by doing so, the algorithm does no longer converge to true locations as more data is added.

Conclusion

Condition monitoring is a crucial aspects for railway safety as well as efficient maintenance planning. The novel algorithm for mutual alignment of track geometry data presented in this paper addresses five key features which must be resolved to enable monitoring of deterioration over time as well as predictive maintenance. For example, values of parameters may be predicted for one or more future points in time based on past variations of the parameter over time. Then an alert may be generated for example if the value of the parameter exceeds a predetermined threshold or is predicted to exceed a predetermined threshold within a predetermined period.

It should be noted that monitoring as described here may be useful to check the effectiveness of a rail or track maintenance operation, known in the art as an intervention, as well as to monitor possible degradation in track conditions.

The algorithm described here successfully solves alignment of segmented data sampled at variable sample rates, spatially correlated and uncorrelated measurement errors, convergence to true locations, and consistent alignment over time. The limitations of the algorithm mainly apply to the amount of data and flexibility in the alignment required to ensure convergence. The advantages of the algorithm are shown in a case study by aligning nine different track geometry parameters on a reference line operated by British Network Rail.

Some operations of the methods described herein may be performed by software in machine readable form e.g. in the form of a computer program comprising computer program code. Thus there is disclosed here a computer readable medium which when implemented in a computing system cause the system to perform some or all of the operations of any of the methods described here. The computer readable medium may be in transitory or tangible (or non-transitory) form such as storage media include disks, thumb drives, memory cards etc. The software can be suitable for execution on a parallel processor or a serial processor such that the method steps may be carried out in any suitable order, or simultaneously.

The methods described here may be implemented using any suitable computer, computing device or computing system.

Figure 8:
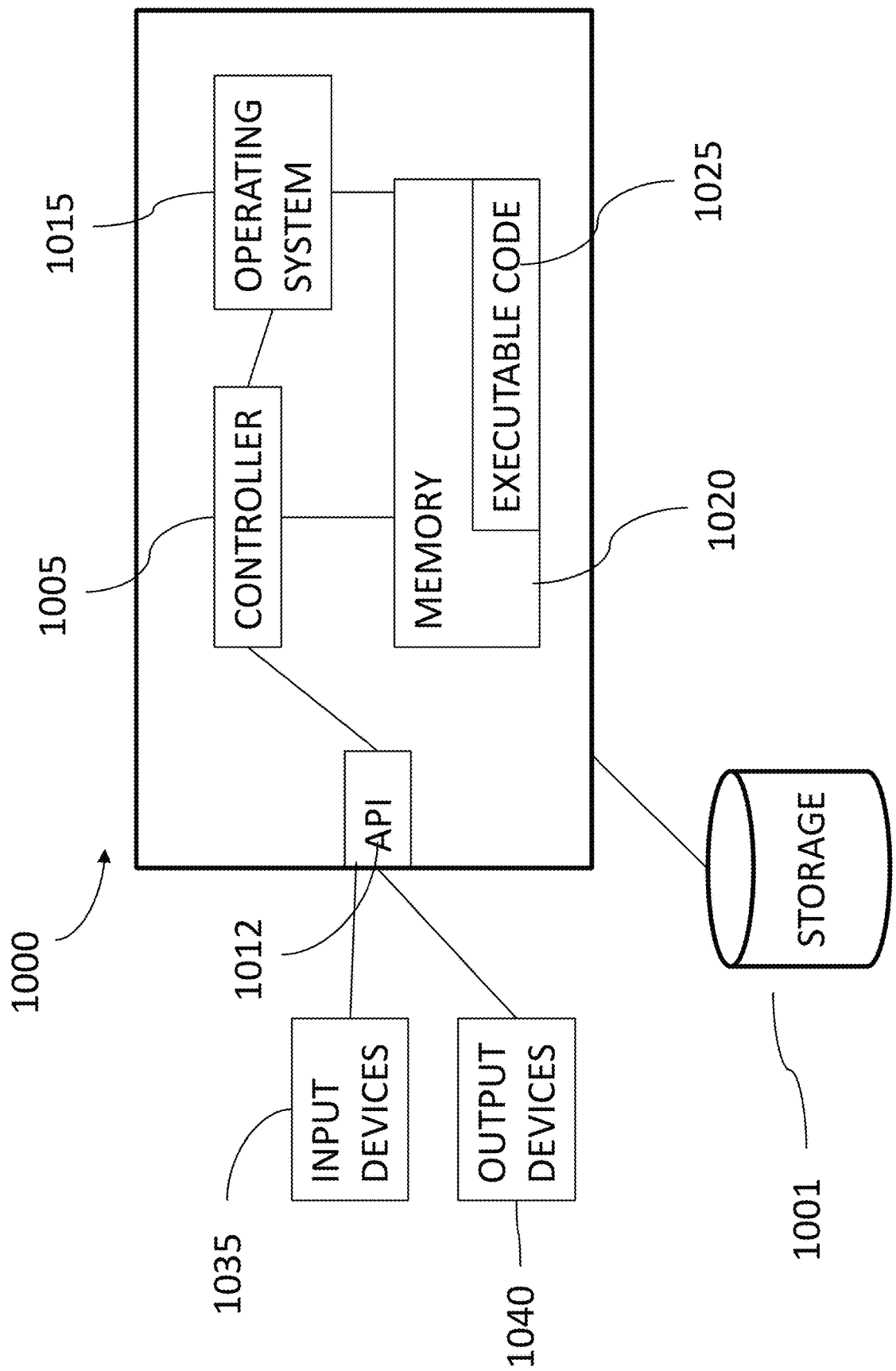
FIG. 8 is a block diagram of a computing system suitable for use in implementing any of the methods described here.

A suitable computing system is illustrated in FIG. 8 for completeness. Computing system 1000 may comprise a single computing device or components such as a laptop, tablet, desktop or other computing device. Alternatively functions of system 1000 may be distributed across multiple computing devices. Computing system 800 may include one or more controllers such as controller 1005 that may be, for example, a central processing unit processor (CPU), a chip or any suitable processor or computing or computational device, an operating system 1015, a memory 1020 storing executable code 1025, storage 1030 which may be external to the system or embedded in memory 1020, one or more input devices 1035 and one or more output devices 1040.

One or more processors in one or more controllers such as controller 1005 may be configured to carry out any of the methods described here. For example, one or more processors within controller 1005 may be connected to memory 1020 storing software or instructions that, when executed by the one or more processors, cause the one or more processors to carry out any of the methods described here. Controller 1005 or a central processing unit within controller 1005 may be configured, for example, using instructions stored in memory 1025, to perform the operations shown in FIG. 1.

Measurement data received at operation 100 of FIG. 1 may be received at a processor comprised in the controller 1005 which then controls the subsequent operations of FIG. 1 according to one or more algorithms which may be stored as part of the executable code 1025.

Input devices 1035 may be or may include a mouse, a keyboard, a touch screen or pad or any suitable input device. It will be recognized that any suitable number of input devices may be operatively connected to computing system 1000 as shown by block 1035 . Output devices 1040 may include one or more displays, speakers and/or any other suitable output devices. It will be recognized that any suitable number of output devices may be operatively connected to computing system 1000 as shown by block 1040. The input and output devices may for example be used to enable a user to select information, e.g. graphs as shown here, to be displayed, or to receive alerts as described in the foregoing.

Input to and output from a computing system may be via an application programming interface "API", such as API 1012 shown in FIG. 8. The API 1012 shown in FIG. 8 operates under the control of the controller 1005 executing instructions stored in memory 1020. Input to and output from the system via the API may be via input/output port 1013.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The embodiments described above are largely automated. In some examples a user or operator of the system may manually instruct some steps of the method to be carried out.

It will be understood that the benefits and advantages described above may relate to one embodiment or may relate to several embodiments. The embodiments are not limited to those that solve any or all of the stated problems or those that have any or all of the stated benefits and advantages.

Any reference to "an" item or "piece" refers to one or more of those items unless otherwise stated. The term "comprising" is used herein to mean including the method steps or elements identified, but that such steps or elements do not comprise an exclusive list and a method or apparatus may contain additional steps or elements.

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of aligning rail geometry parameter measurements comprising:
   measuring a rail with a track recording vehicle to collect measurement data;
   receiving the measurement data indicating variations in a parameter of the rail along a length of the rail derived from measurement runs performed at different points in time, each item of measurement data comprising a value for the parameter and an estimate of a location at which the parameter was measured;
   forming a signal corresponding to each measurement run;
   finding pairwise relative offsets between spatially overlapping segments in the signals corresponding to consecutive windows within the signals;
   for each signal and window computing an average relative offset to other signals;
   determining errors in the location estimates based on the computed average relative offsets;
   using the determined errors to refine the location estimates in signal data; and
   generating an alert if the value of the parameter exceeds a predetermined threshold or is predicted to exceed a predetermined threshold within a predetermined period,
   wherein determining of errors in the location estimates is computed by imposing that a weighted average within each window should be zero, and
   wherein the weighted average is computed using one or more weights that depend on a distance from the nearest estimated relative offset.

2. The method of claim 1, wherein if a determination of pairwise offsets fails to meet one or more criteria:
   repeating the finding pairwise offsets and computing average relative offset using a smaller window size,
   determining errors in the refined location estimates based on a newly computed average relative offsets, and
   using newly determined errors to refine the location estimates in the signal data.

3. The method of claim 2, comprising repeating the finding pairwise offsets, determining errors and refining location estimates in successive iterations using a smaller window size until the alignment meets the one or more criteria.

4. The method of claim 2, wherein the one or more criteria comprise a pre-defined cross correlation threshold.

5. The method of claim 1, wherein the pairwise relative offsets are found using cross correlation.

6. The method of claim 1, comprising segmenting the data in each measurement run prior to the signal formation.

7. The method of claim 6, wherein segmenting the data comprises segmenting the data between pairs of measurements that correspond to locations more than a predetermined distance apart.

8. The method of claim 1, wherein the signal forming comprises modelling the received measurement data as a continuous function of location.

9. The method of claim 1, comprising adjusting estimated locations by imputing a fixed distance between estimated locations prior to the signal formation.

10. The method of claim 1, further comprising monitoring a condition of a rail track system.

11. The method of claim 10, comprising identifying a part of a rail as requiring maintenance if the parameter at that part exceeds or falls below a threshold.

12. The method of claim 10, comprising predicting a value for the parameter for at least one future point in time based on past variations of the parameter over time.

13. The method of claim 10, comprising generating an alert if the value of the parameter exceeds a predetermined threshold or is predicted to exceed a predetermined threshold within a predetermined period.

14. The method of claim 1, wherein the measurement data relates to a track comprising a pair of rails and relates to one or more of cross level, gauge, horizontal profile and vertical profile.

15. A system for rail maintenance comprising:
a computer processor in electronic communication with one or more sensors; and
a computer readable medium containing computer instructions stored therein for causing the computer processor to perform a method of aligning rail parameter measurements comprising:
(a) measuring a rail via one or more sensors in electronic communication with the computer processor to obtain measurement data indicating variations in a parameter of the rail along the length of the rail derived from measurement runs performed at different points in time, each item of measurement data comprising a value for the parameter and an estimate of a location at which the parameter was measured;
(b) forming a signal corresponding to each measurement run;
(c) finding pairwise relative offsets between spatially overlapping segments in the signals corresponding to consecutive windows within the signals;
(d) for each signal and window computing an average relative offset to other signals;
(e) determining errors in the location estimates based on the computed average relative offsets;
(f) using the determined errors to refine the location estimates in signal data; and
(g) using the refined location estimates to identify one or more parts of a rail that require maintenance; and
wherein determining of errors in the location estimates is computed by imposing that a weighted average within each window should be zero, and
wherein the weighted average is computed using one or more weights that depend on a distance from the nearest estimated relative offset.

16. A computing system comprising a processor in electronic communication with one or more sensors and configured to perform a method of aligning rail parameter measurements, the method comprising:
measuring a rail to gather measurement data of a rail via the one or more sensors;
receiving the measurement data indicating variations in a rail track geometry parameter of the rail along the length of the rail derived from measurement runs performed at different points in time, each item of measurement data comprising a value for the rail track geometry parameter and an estimate of a location at which the rail track geometry parameter was measured;
forming a signal corresponding to each measurement run;
finding pairwise relative offsets between spatially overlapping segments in the signals corresponding to consecutive windows within the signals;
for each signal and window computing an average relative offset to other signals;
determining errors in the location estimates based on the computed average relative offsets;
using the determined errors to refine the location estimates in signal data; and
generating an alert if the value of the rail track geometry parameter exceeds a predetermined threshold or is predicted to exceed a predetermined threshold within a predetermined period, wherein determining of errors in the location estimates is computed by imposing that a weighted average within each window should be zero, and
wherein the weighted average is computed using one or more weights that depend on a distance from the nearest estimated relative offset.

* * * * *